United States Patent
Park et al.

(10) Patent No.: US 11,572,948 B2
(45) Date of Patent: Feb. 7, 2023

(54) METHOD OF CONTROLLING ENGINE AND TRANSMISSION OF HYBRID VEHICLE

(71) Applicants: Hyundai Motor Company, Seoul (KR); Kia Motors Corporation, Seoul (KR)

(72) Inventors: Jun Sung Park, Gyeonggi-do (KR); Jaebin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 17/075,100

(22) Filed: Oct. 20, 2020

(65) Prior Publication Data

US 2022/0025971 A1   Jan. 27, 2022

(30) Foreign Application Priority Data

Jul. 21, 2020   (KR) .................. 10-2020-0090021

(51) Int. Cl.
   *B60W 10/06*   (2006.01)
   *F16H 63/50*   (2006.01)
   *B60W 10/02*   (2006.01)

(52) U.S. Cl.
   CPC ........... *F16H 63/502* (2013.01); *B60W 10/02* (2013.01); *B60W 10/06* (2013.01)

(58) Field of Classification Search
   CPC ...... F16H 63/502; B60W 10/02; B60W 10/06
   See application file for complete search history.

(56) References Cited

U.S. PATENT DOCUMENTS 6,435,049 B1 *   8/2002   Janasek ............... F16H 61/0437
                                          477/143

FOREIGN PATENT DOCUMENTS

| CN | 1165099 A | * | 11/1997 | ............ B60P 7/0807 |
| CN | 108501940 A | * | 9/2018 | ............ B60K 6/387 |
| EP | 1647741 A1 | * | 4/2006 | ............ B60W 10/06 |
| JP | 2000337195 A | * | 12/2000 | ............ F02D 41/14 |

* cited by examiner

*Primary Examiner* — Tisha D Lewis
(74) *Attorney, Agent, or Firm* — Fox Rothschild LLP; Peter F. Corless

(57) ABSTRACT

A method of controlling an engine and a transmission of a hybrid vehicle includes steps of: determining whether the vehicle starts, determining an engine RPM and a gear stage of a transmission if the vehicle has started, determining whether the engine RPM has reached an engine speed control point, determining an engine target RPM and an engine target RPM slope of the vehicle when it is determined that the engine RPM has reached the engine speed control point, controlling the engine RPM of the vehicle to follow the engine target RPM and the engine target RPM slope, determining whether the engine RPM has slipped compared to the target engine RPM, and performing PID control to follow the engine target RPM if the engine RPM slips compared to the engine target RPM.

11 Claims, 15 Drawing Sheets

FIG. 7

| Division | 0 | 500 | 1000 | 2000 | 3000 | 4000 | 5000 | 6000 | 7000 |
|---|---|---|---|---|---|---|---|---|---|
| 0 | 0 | 0 | 0 | 0 | 0 | 0 | 0 | 0 | 0 |
| 10% | 0 | 0 | 1 | 1 | 1 | 1 | 1 | 1 | 1 |
| 20% | 0 | 0 | 1 | 1 | 1 | 1 | 1 | 1 | 1 |
| .... | .... | .... | .... | .... | .... | .... | .... | .... | .... |
| 80% | 0 | 1 | 1 | 1 | 1 | 1 | 1 | 1 | 1 |
| 90% | 0 | 1 | 1 | 1 | 1 | 1 | 1 | 1 | 1 |
| 100% | 0 | 0 | 0 | 0 | 0 | 0 | 0 | 0 | 0 |

FIG. 8

| Division | 0 | 500 | 1000 | 2000 | 3000 | 4000 | 5000 | 6000 | 7000 |
|---|---|---|---|---|---|---|---|---|---|
| 1 Stage | 0 | 500 | 1000 | 2100 | 3100 | 4100 | 5000 | 6000 | 7000 |
| 2 Stage | 0 | 500 | 1000 | 2100 | 3100 | 4100 | 5000 | 6000 | 7000 |
| 3 Stage | 0 | 500 | 1000 | 2100 | 3100 | 4100 | 5000 | 6000 | 7000 |
| .... | .... | .... | .... | .... | .... | .... | .... | .... | .... |
| 5 Stage | 0 | 500 | 1000 | 2100 | 3100 | 4100 | 5000 | 6000 | 7000 |
| 6 Stage | 0 | 500 | 1000 | 2100 | 3100 | 4100 | 5000 | 6000 | 7000 |
| 7 Stage | 0 | 500 | 1000 | 2100 | 3100 | 4100 | 5000 | 6000 | 7000 |

FIG. 11

| Division | 0 | 500 | 1000 | 2000 | 3000 | 4000 | 5000 | 6000 | 7000 |
|---|---|---|---|---|---|---|---|---|---|
| 1 Stage | 0 | 500 | 1000 | 2100 | 3100 | 4100 | 5000 | 6000 | 7000 |
| 2 Stage | 0 | 500 | 1000 | 2100 | 3100 | 4100 | 5000 | 6000 | 7000 |
| 3 Stage | 0 | 500 | 1000 | 2100 | 3100 | 4100 | 5000 | 6000 | 7000 |
| .... | .... | .... | .... | .... | .... | .... | .... | .... | .... |
| 5 Stage | 0 | 500 | 1000 | 2100 | 3100 | 4100 | 5000 | 6000 | 7000 |
| 6 Stage | 0 | 500 | 1000 | 2100 | 3100 | 4100 | 5000 | 6000 | 7000 |
| 7 Stage | 0 | 500 | 1000 | 2100 | 3100 | 4100 | 5000 | 6000 | 7000 |

FIG. 12

| Division | N Stage | 1 Stage | 2 Stage | 3 Stage | 4 Stage | 5 Stage | 6 Stage | 7 Stage |
|---|---|---|---|---|---|---|---|---|
| 0 | 0 | 0 | 0 | 0 | 0 | 0 | 0 | 0 |
| 10% | 0 | 50 | 50 | 50 | 50 | 60 | 70 | 70 |
| 20% | 0 | 50 | 50 | 50 | 50 | 60 | 70 | 70 |
| .... | .... | .... | .... | .... | .... | .... | .... | .... |
| 80% | 0 | 80 | 80 | 80 | 100 | 100 | 100 | 100 |
| 90% | 0 | 500 | 80 | 80 | 100 | 100 | 100 | 100 |
| 100% | 0 | 100 | 100 | 100 | 100 | 100 | 100 | 100 |

FIG. 13

| Division | 1 Stage | 2 Stage | 3 Stage | 4 Stage | 5 Stage | 6 Stage | 7 Stage |
|---|---|---|---|---|---|---|---|
| 0 | 1 | 1 | 1 | 1 | 1 | 0 | 0 |
| 10% | 1 | 1 | 1 | 1 | 1 | 0 | 0 |
| 20% | 1 | 1 | 1 | 1 | 1 | 0 | 0 |
| .... | .... | .... | .... | .... | .... | .... | .... |
| 80% | 1 | 1 | 1 | 1 | 1 | 0 | 0 |
| 90% | 0 | 0 | 0 | 0 | 0 | 0 | 0 |
| 100% | 0 | 0 | 0 | 0 | 0 | 0 | 0 |

FIG. 14

| Division | 0 | 500 | 1000 | .... | 6000 | 7000 |
|---|---|---|---|---|---|---|
| 1-2 | 0 | 50 | 100 | .... | 200 | 300 |
| 2-3 | 0 | 50 | 100 | .... | 200 | 300 |
| 3-4 | 0 | 50 | 100 | .... | 200 | 300 |
| .... | .... | .... | .... | .... | .... | .... |
| 4-5 | 0 | 50 | 100 | .... | 200 | 300 |
| 5-6 | 0 | 50 | 100 | .... | 200 | 300 |
| 6-7 | 0 | 50 | 100 | .... | 200 | 300 |

FIG. 15

| Division | 0 | 500 | 1000 | .... | 6000 | 7000 |
|---|---|---|---|---|---|---|
| 2-1 | 0 | 50 | 100 | .... | 200 | 300 |
| 3-1 | 0 | 50 | 100 | .... | 200 | 300 |
| 3-2 | 0 | 50 | 100 | .... | 200 | 300 |
| .... | .... | .... | .... | .... | .... | .... |
| 7-4 | 0 | 50 | 100 | .... | 200 | 300 |
| 7-5 | 0 | 50 | 100 | .... | 200 | 300 |
| 7-6 | 0 | 50 | 100 | .... | 200 | 300 |

METHOD OF CONTROLLING ENGINE AND TRANSMISSION OF HYBRID VEHICLE

CROSS-REFERENCE TO RELATED APPLICATION

This application claims under 35 U.S.C. § 119 the benefit of Korean Patent Application No. 10-2020-0090021 filed in the Korean Intellectual Property Office on Jul. 21, 2020, the entire contents of which are incorporated herein by reference.

BACKGROUND

(a) Technical Field

The present disclosure relates to a method of controlling an engine and a transmission of a hybrid vehicle, more particularly, to the method of controlling the engine and the transmission capable of implementing a linear start and smooth shifting even when a driver's pedal/clutch operation is inexperienced by controlling engine RPM (revolutions per minute) to follow an engine target RPM when starting the vehicle or when shifting, and controlling the transmission to operate linearly.

(b) Description of the Related Art

As is well known, hybrid electric vehicles use both an internal combustion engine and battery power. That is, a hybrid vehicle efficiently combines and uses power of the internal combustion engine and power of a motor.

Hybrid vehicles can be classified into a mild type and a hard type according to a power sharing ratio between the engine and the motor. The mild-type hybrid vehicle (hereinafter, referred to as a mild hybrid vehicle) is provided with a mild hybrid starter & generator (MHSG) that starts the engine or generates power by an output of the engine instead of an alternator. In the hard-type hybrid vehicle, a starting generator that starts the engine or generates power by an output of the engine and a drive motor that drives the vehicle are separately provided.

Mild hybrid vehicles can use the MHSG to assist engine torque according to driving conditions and charge a battery (e.g., a 48 V battery) through regenerative braking. Accordingly, the fuel economy of the mild hybrid vehicle can be improved.

Meanwhile, in a 48 V hybrid system, SSC (Start & Stop coasting) technology that satisfies fuel economy and eco-friendly regulations by turning off a transmission clutch under certain conditions and turning off the engine, and NCC (Neutral Coasting Control) technology that only turns off the transmission clutch under certain conditions is used. SSC is a control technology that completely turns off engine start by continuously decreasing the transmission clutch and engine RPM under certain conditions after releasing a pedal. In addition, NCC is a control technology that keeps a clutch RPM reduced by turning off only the transmission clutch and maintains the engine RPM after a certain level.

However, as shown in FIG. 1 (RELATED ART), when the vehicle is started, torque of a wheel is irregularly changed due to inexperience of clutch operation, so that the vehicle's rumble is generated, and the engine RPM is excessively increased. In addition, as shown in FIG. 2 (RELATED ART), when the vehicle is shifting, the engine RPM rapidly decreases due to inexperience in clutch operation, and in the process of increasing the engine RPM, the vehicle's rumble is severely generated according to an unstable engine RPM change. Therefore, there is a problem that ride comfort is lowered and anxiety may be caused.

With such an existing system, a driver who is inexperienced in clutch operation typically avoids using a manual transmission vehicle. Accordingly, an engine and transmission control system (EMS/TMS) that automatically corrects the vehicle even when the driver's clutch operation is inexperienced is applied by application of an intelligent manual transmission (iMT) system capable of implementing electronic clutch control.

Since the engine performs only control that follows the target torque according to the amount a clutch pedal is pressed by the driver, if a jerk or shock phenomenon occurs, control is performed after correcting it. In this case, there is no separate control for improving a portion where the reactivity is slow and sagging occurs before jerk. In addition, conventional manual transmission (MT) and iMT transmissions implement a method in which a clutch is coupled as it is according to the operation of the clutch pedal by the driver, and there is no separate transmission/actuator control.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a method of controlling an engine and a transmission of a hybrid vehicle that can smoothly improve ride comfort by controlling the engine RPM that changes when the vehicle starts or when shifting to follow an engine target RPM and a transmission RPM to follow a clutch actuator target stroke.

A method of controlling an engine and a transmission of a vehicle (e.g., a hybrid vehicle) according to an exemplary embodiment of the present disclosure includes determining, by a controller, whether the vehicle starts or not, determining, by the controller, an engine RPM and a gear stage of a current vehicle transmission if the vehicle has started, determining, by the controller, whether the engine RPM has reached an engine speed control point, determining, by the controller, an engine target RPM and an engine target RPM slope of the vehicle when it is determined that the engine RPM has reached the engine speed control point, controlling, by the controller, the engine RPM of the vehicle to follow the engine target RPM and the engine target RPM slope, determining, by the controller, whether the engine RPM has slipped compared to the target engine RPM, performing proportional integral derivative (PID) control, by the controller, to follow the engine target RPM if the engine RPM slips compared to the engine target RPM, determining, by the controller, whether engine RPM control of the vehicle is ended, and ending the engine RPM control, by the controller, of the vehicle if it is determined that the engine RPM control of the vehicle is ended.

The method of controlling engine and transmission of a hybrid vehicle according to an exemplary embodiment of the present disclosure may further include after determining, by the controller, whether the engine RPM has reached an engine speed control point, determining, by the controller, whether the driver has operated the clutch and shifted gears, determining, by the controller, a clutch actuator target stroke when it is determined that the driver has operated the clutch and shifted the gear, performing, by the controller, a transmission RPM control of the vehicle to follow the clutch actuator target stroke, determining, by the controller, whether the transmission RPM control of the vehicle is ended, and ending the transmission RPM control, by the controller, of the vehicle if it is determined that the transmission RPM control of the vehicle is ended.

The ending the engine RPM control, by the controller, of the vehicle may be to switch from engine speed control to engine torque (TQ) control.

In determining, by the controller, whether the engine RPM has reached the engine speed control point, the engine speed control point may be determined by a first map table preset for the transmission RPM and an amount of operation of a pedal.

In determining, by the controller, the engine target RPM and the engine target RPM slope of the vehicle, the target engine RPM of the vehicle may be determined by the transmission RPM and a second map table preset for the gear stage.

The performing PID control, by the controller, to follow the engine target RPM may be accomplished through responsive engine ignition timing and sustained throttle opening.

In a situation in which the engine RPM is overshot compared to the engine target RPM, the controller may control the engine ignition timing to be retarded and to reduce the throttle opening amount.

In a situation in which the engine RPM is undershot compared to the engine target RPM, the controller may control the engine ignition timing to advance and to increase the throttle opening amount.

In determining, by the controller, whether engine RPM control of the vehicle is ended, the end point of engine RPM control of the vehicle may be determined by the transmission RPM and the third map table preset for the gear stage.

In determining, by the controller, a clutch actuator target stroke, the clutch actuator target stroke may be determined by a fourth map table preset for the gear stage and an amount of operation of a pedal.

According to an exemplary embodiment of the present disclosure, by controlling the engine RPM to follow the engine target RPM when starting the vehicle or when shifting, and controlling the transmission to operate linearly, linear start and smooth shifting can be realized even when the driver's pedal/clutch operation is inexperienced.

A non-transitory computer readable medium containing program instructions executed by a processor includes: program instructions that determine whether a vehicle starts or not; program instructions that determine an engine RPM and a gear stage of a vehicle transmission if the vehicle has started; program instructions that determine whether the engine RPM has reached an engine speed control point; program instructions that determine an engine target RPM and an engine target RPM slope of the vehicle when it is determined that the engine RPM has reached the engine speed control point; program instructions that control the engine RPM of the vehicle to follow the engine target RPM and the engine target RPM slope; program instructions that determine whether the engine RPM has slipped compared to the target engine RPM; program instructions that perform proportional integral derivative (PID) control, by the controller, to follow the engine target RPM if the engine RPM slips compared to the engine target RPM; program instructions that determine whether engine RPM control of the vehicle is ended; and program instructions that end the engine RPM control of the vehicle if it is determined that the engine RPM control of the vehicle is ended.

BRIEF DESCRIPTION OF THE DRAWINGS

FIG. 7 is a table showing an example of a first map table for determining an engine speed control point during start control in a method of controlling an engine and a transmission of a hybrid vehicle according to an exemplary embodiment of the present disclosure.

FIG. 8 is a table showing an example of a second map table for determining an engine target RPM during start control in a method of controlling an engine and a transmission of a hybrid vehicle according to an exemplary embodiment of the present disclosure.

FIG. 11 is a table showing an example of a third map table for determining an end point of engine RPM control of a vehicle during start control in a method of controlling an engine and a transmission of a hybrid vehicle according to an exemplary embodiment of the present disclosure.

FIG. 12 is a table showing an example of a fourth map table for determining a clutch actuator target stroke during start control in a method of controlling an engine and a transmission of a hybrid vehicle according to an exemplary embodiment of the present disclosure.

FIG. 13 is a table showing an example of a fifth map table for determining an engine speed control time point when shifting in a method of controlling an engine and a transmission of a hybrid vehicle according to an exemplary embodiment of the present disclosure.

FIG. 14 is a table showing an example of a sixth map table for determining an engine target RPM of a vehicle when shifting in a method of controlling an engine and a transmission of a hybrid vehicle according to an exemplary embodiment of the present disclosure.

FIG. 15 is a table showing an example of a seventh map table for determining an engine target RPM of a vehicle when shifting in a method of controlling an engine and a transmission of a hybrid vehicle according to an exemplary embodiment of the present disclosure.

DETAILED DESCRIPTION OF THE EMBODIMENTS

Figure 1:
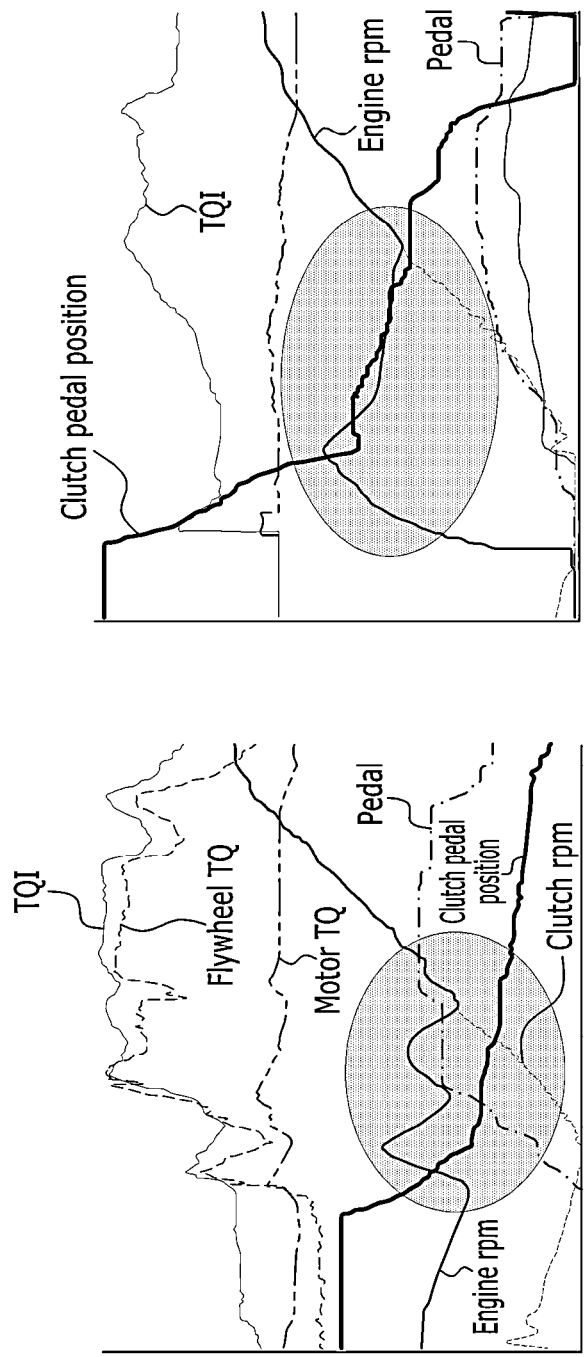
FIG. 1 (RELATED ART) is a view showing a change in engine RPM according to a clutch operation while driving a conventional vehicle.
Figure 2:
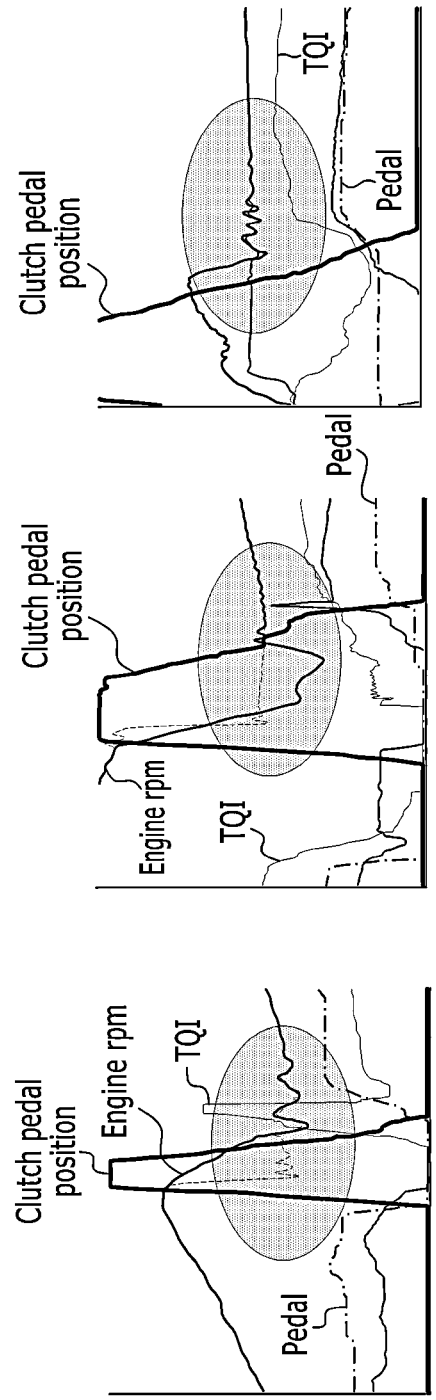
FIG. 2 (RELATED ART) is a view showing a change in engine RPM according to a clutch operation during a conventional vehicle shift.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. As a result, various modifications of the drawings will be expected.

Now, a method of controlling an engine and a transmission of a hybrid vehicle according to an exemplary embodiment of the present disclosure will be described with reference to FIGS. 3 and 6.

Figure 3:
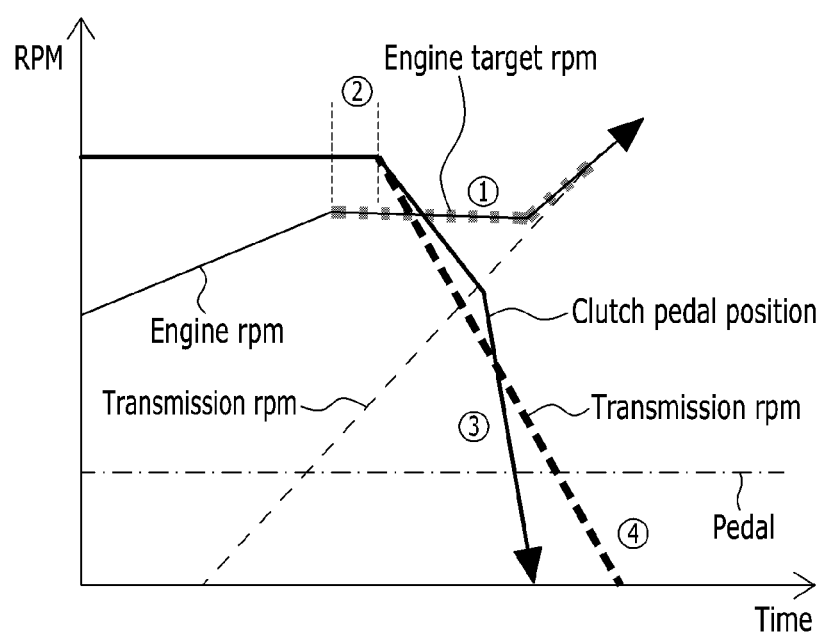
FIG. 3 is a view showing an engine RPM and a transmission RPM when a vehicle starts, which is improved by a method of controlling an engine and a transmission of a hybrid vehicle according to an exemplary embodiment of the present disclosure.
Figure 6:
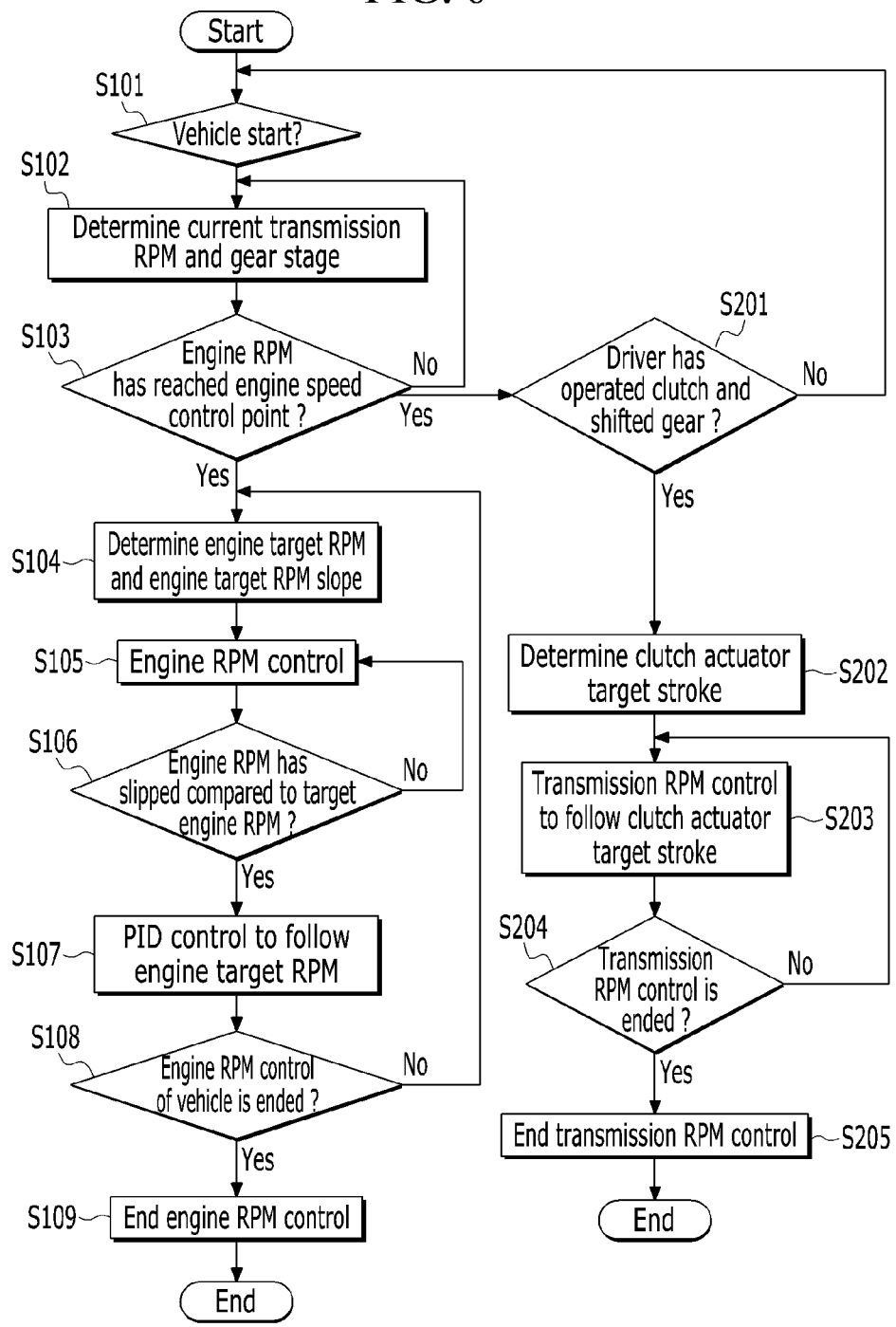
FIG. 6 is a diagram illustrating a method of controlling an engine and a transmission of a hybrid vehicle according to an exemplary embodiment of the present disclosure.

FIG. 3 is a view showing an engine RPM and a transmission RPM when a vehicle starts, which is improved by a method of controlling an engine and a transmission of a hybrid vehicle according to an exemplary embodiment of the present disclosure, and FIG. 6 is a diagram illustrating a method of controlling an engine and a transmission of a hybrid vehicle according to an exemplary embodiment of the present disclosure.

Referring to FIG. 6, in the method of controlling an engine and a transmission of a hybrid vehicle according to an exemplary embodiment of the present disclosure, the controller determines whether the vehicle is started (S101). In this case, the controller may be, for example, one or more microprocessors (e.g., an ECU (Engine Control Unit or Electronic Control Unit)) operated by a program or hardware including the microprocessor. The program may include a series of instructions for performing a method of controlling an engine and a transmission of a hybrid vehicle according to an exemplary embodiment of the present disclosure.

Then, if it is determined that the vehicle has started, the controller determines the RPM and gear stage of the current vehicle transmission (S102). Current transmission RPM and gear stage must be continuously monitored in real time so that the timing of control entry and the target RPM behavior at that point can be determined immediately.

Then, the controller determines whether the engine RPM has reached the engine speed control point (S103). At this time, the engine speed control timing may be determined by a first map table preset for the transmission RPM and an amount of operation of a pedal.

FIG. 7 is a table showing an example of a first map table for determining an engine speed control point during start control in a method of controlling an engine and a transmission of a hybrid vehicle according to an exemplary embodiment of the present disclosure. The first map table is preset to 1 or 0 according to the current transmission RPM monitored in real time and the amount of operation of the pedal, and if it stays in the 0 area, engine speed control does not start, and when entering the 1 person area, engine speed control can start.

Then, when it is determined that the engine RPM has reached the engine speed control point, the controller determines the engine target RPM and the engine target RPM slope of the vehicle (S104). In this case, the engine target RPM may be determined by a second map table preset for the transmission RPM and the gear stage.

FIG. 8 is a table showing an example of a second map table for determining an engine target RPM during start control in a method of controlling an engine and a transmission of a hybrid vehicle according to an exemplary embodiment of the present disclosure. According to the current transmission RPM and gear stage monitored in real time, the engine RPM listed in the table may be determined as the engine target RPM. In addition, a slope of a straight line in which the transmission RPM increases over time may be determined as the engine target RPM slope.

Then, the controller performs engine RPM control of the vehicle so that the engine target RPM and the engine target RPM slope are followed (S105).

In this case, the control may be performed in the same form as proportional integral derivative (PID) control used in idle speed control in an EMS (Engine Management System). PID control can be achieved by adjusting the engine ignition timing and throttle opening amount. The engine RPM of the vehicle is controlled to follow the engine target RPM slope, that is, synchronized with the transmission RPM.

Then, the controller determines whether the engine RPM has slipped compared to the target engine RPM (S106). When the engine RPM deviates from the straight line connecting the start point and the end point and a splash occurs, it is determined that the engine RPM slips compared to the target engine RPM.

Then, when it is determined that the engine RPM has slipped compared to the engine target RPM, the controller performs PID control to follow the engine target RPM (S107).

In this case, PID control may be performed by adjusting the engine ignition timing with fast response and adjusting the throttle opening amount with strong persistence.

Figure 9:
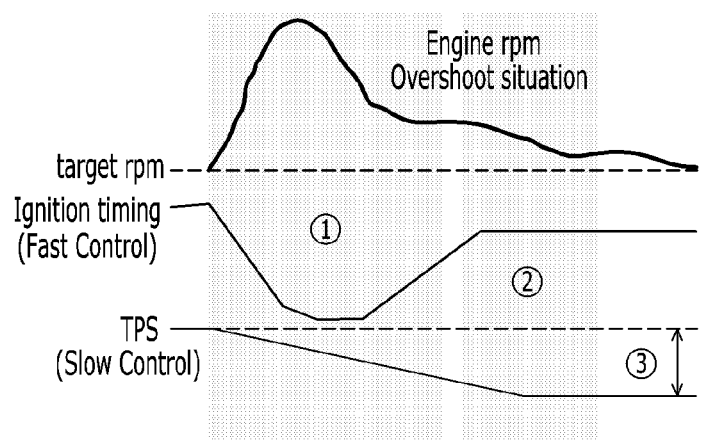
FIG. 9 is a conceptual diagram illustrating PID control for following an engine target RPM in an overshoot situation in which engine RPM is compared to an engine target RPM in a method of controlling an engine and a transmission of a hybrid vehicle according to an exemplary embodiment of the present disclosure.

As shown in FIG. 9, when the engine RPM is overshot compared to the engine target RPM, the controller can control the engine ignition timing to be retarded and the throttle opening amount to be reduced. Further, as shown in FIG. 10, when the engine RPM is undershot compared to the engine target RPM, the controller may advance the engine ignition timing and control the throttle opening amount to increase.

Figure 10:
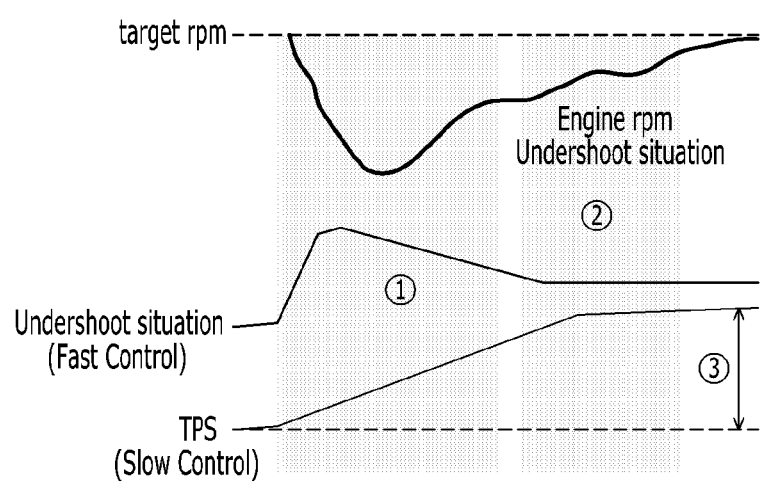
FIG. 10 is a conceptual diagram illustrating PID control for following an engine target RPM in an undershoot situation in which engine RPM is compared to an engine target RPM in a method for controlling an engine and transmission of a hybrid vehicle according to an embodiment of the present disclosure.

FIG. 9 is a conceptual diagram illustrating PID control for following an engine target RPM in an overshoot situation in which engine RPM is compared to an engine target RPM in a method of controlling an engine and a transmission of a hybrid vehicle according to an exemplary embodiment of the present disclosure, and FIG. 10 is a conceptual diagram illustrating PID control for following an engine target RPM in an undershoot situation in which engine RPM is compared to an engine target RPM in a method for controlling an engine and transmission of a hybrid vehicle according to an embodiment of the present disclosure.

Referring to FIG. 9, when the engine RPM is overshot compared to the engine target RPM, the controller recognizes the ignition timing in the control section (①) mainly for the ignition timing among P and D gains with fast response, controls to reduce the throttle opening amount in the control section (②) centered on the throttle position sensor (TPS) among the P and D gains, which have a slow response but are advantageous in terms of persistence, and then reflects the deviation of the throttle opening amount to the I gain in the ③ section to complete the correction.

Referring to FIG. 10, when the engine RPM is undershot compared to the engine target RPM, the controller advances the engine ignition timing in the ignition timing-oriented control section (①), controls to increase the throttle opening amount in the control section (②) mainly for the throttle opening amount, and then reflects the deviation of the throttle opening amount to the I gain in the ③ section to complete the correction.

By PID control according to FIGS. 9 and 10, by removing the slip phenomenon of the engine RPM and controlling the engine RPM to follow the engine target RPM, it is possible to smoothly improve the feeling of deceleration and to eliminate the noise of the vehicle.

Then, the controller determines whether the engine RPM control of the vehicle is ended (S108). This is a step to determine when the engine RPM is synchronized with the transmission RPM and finished. The timing at which the engine RPM control of the vehicle is ended may be determined by a third map table preset for the transmission RPM and the gear stage.

Then, if it is determined that the engine RPM control of the vehicle is ended, the engine RPM control of the vehicle is ended S109. Accordingly, it is switched from engine speed control to engine torque (TQ) control.

Meanwhile, after the step S103 of determining whether the engine RPM has reached the engine speed control point, the controller determines whether the driver has operated the clutch and shifted the gear (S201).

When it is determined that the driver has operated the clutch and shifted the gear, the controller determines the clutch actuator target stroke (S202). In this case, the clutch actuator target stroke may be determined by a fourth map table preset for the gear stage and the amount of operation of the pedal. Since the actuator target slope for improving shock and jerk for the pedal is different, the map for each gear stage/pedal is preset.

Then, the controller performs transmission RPM control of the vehicle to follow the clutch actuator target stroke (S203). The clutch actuator is applied hydraulically or electronically according to the actuator target inclination, and the transmission RPM is also controlled accordingly.

Then, the controller determines whether the control of the transmission RPM of the vehicle is ended (S204), and if it is determined that it is the time when the transmission RPM control of the vehicle is ended, the transmission RPM control of the vehicle is ended (S205). The transmission RPM control end point is a point at which actuator control ends, that is, when the engine RPM and the transmission RPM are synchronized.

As shown in FIG. 3, when the vehicle starts, when the engine RPM reaches the engine speed control point (②), the engine RPM of the vehicle is controlled to follow the engine target RPM and the engine target RPM slope (①), and transmission RPM control is performed to follow the clutch actuator target stroke (③). And, when the engine RPM and the transmission RPM are synchronized, the transmission RPM control is completed (④).

Figure 4:
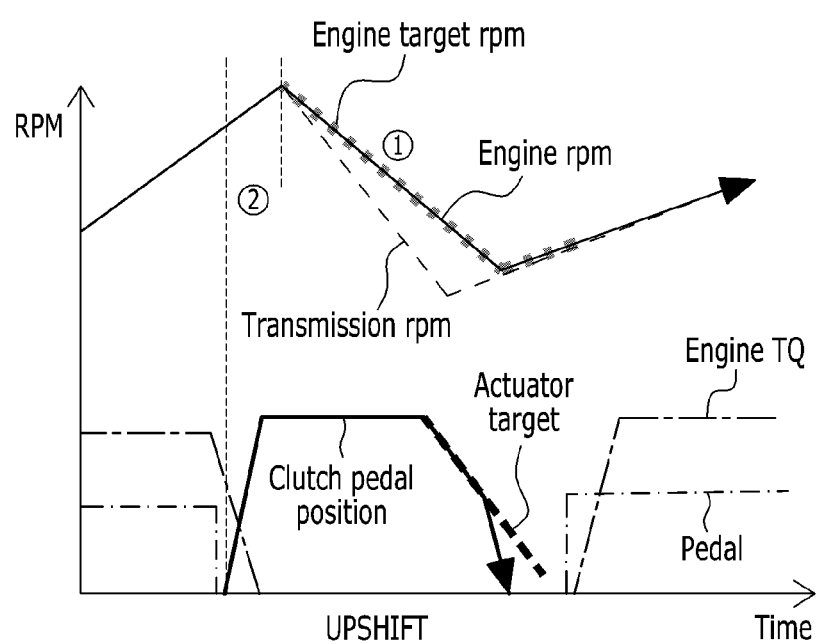
FIG. 4 is a view showing an engine RPM and a transmission RPM improved during a vehicle upshift shift improved by a method of controlling an engine and a transmission of a hybrid vehicle according to an exemplary embodiment of the present disclosure.
Figure 5:
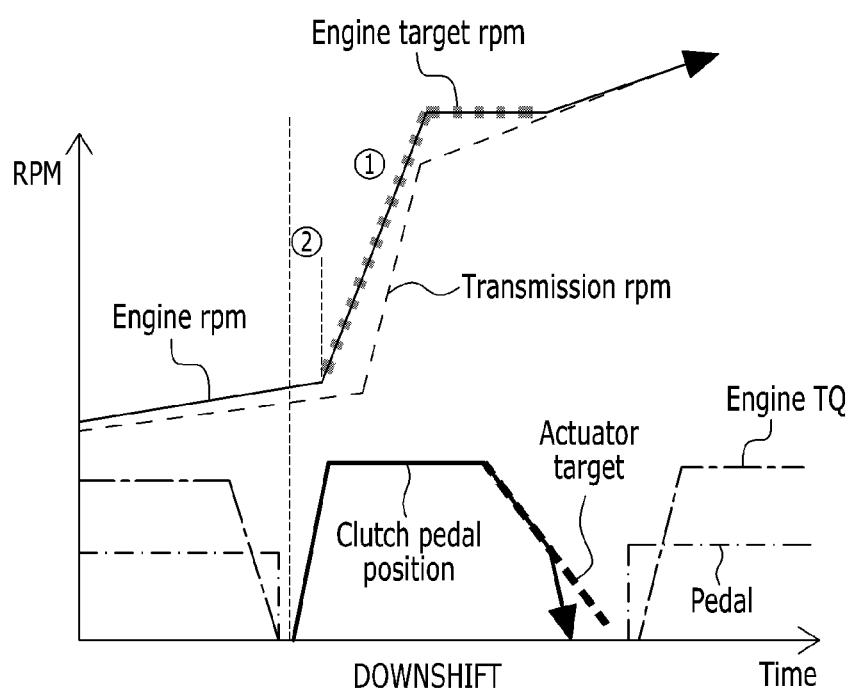
FIG. 5 is a view showing an engine RPM and a transmission RPM improved during a vehicle downshift shift improved by a method of controlling an engine and a transmission of a hybrid vehicle according to an exemplary embodiment of the present disclosure.

Meanwhile, FIG. 4 is a view showing an engine RPM and a transmission RPM improved during a vehicle upshift shift improved by a method of controlling an engine and a transmission of a hybrid vehicle according to an exemplary embodiment of the present disclosure, and FIG. 5 is a view showing an engine RPM and a transmission RPM improved during a vehicle downshift shift improved by a method of controlling an engine and a transmission of a hybrid vehicle according to an exemplary embodiment of the present disclosure.

A method of controlling an engine and a transmission when shifting a hybrid vehicle according to an embodiment of the present disclosure is substantially the same as the method of controlling an engine and a transmission when the hybrid vehicle starts.

However, the engine speed control timing may be determined by the fifth map table preset for the transmission RPM and an amount of operation of a pedal. FIG. 13 is a table showing an example of a fifth map table for determining an engine speed control time point when shifting in a method of controlling an engine and a transmission of a hybrid vehicle according to an exemplary embodiment of the present disclosure. The fifth map table is preset to 1 or 0 according to the current transmission RPM and an amount of operation of a pedal monitored in real time. If it stays in the 0 area, engine speed control does not start, and when entering the 1 area, engine speed control starts.

Also, the engine target RPM may be determined by a sixth map table and a seventh table previously set for the transmission RPM and the gear shift. FIGS. 14 and 15 are tables showing examples of a sixth map table (upshift) and a seventh table (downshift) for determining the target engine RPM of the vehicle during shift control. According to the current transmission RPM and gear shift monitored in real time, the engine RPM listed in the table may be determined as the engine target RPM. In addition, a slope of a straight line in which the transmission RPM increases over time may be determined as the engine target RPM slope.

As shown in FIGS. 4 and 5, when the engine RPM reaches the engine speed control point during upshift or downshift shift of the vehicle (②), the engine RPM of the vehicle is controlled to follow the target engine RPM and the slope of the target engine RPM (①), and the transmission RPM of the vehicle control is carried out to follow the clutch actuator target stroke. The clutch actuator is applied hydraulically or electronically according to the actuator target inclination, and the transmission RPM is also controlled accordingly. Then, when the engine RPM and the transmission RPM are synchronized, the transmission RPM control is completed.

According to an exemplary embodiment of the present disclosure, by controlling the engine RPM to follow the engine target RPM when starting the vehicle or when shifting, and controlling the transmission to operate linearly, linear start and smooth shifting can be realized even when the driver's pedal/clutch operation is inexperienced.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method of controlling an engine and a transmission of a vehicle, comprising:
   determining, by a controller, whether the vehicle starts or not;
   determining, by the controller, an engine RPM and a gear stage of a vehicle transmission if the vehicle has started;
   determining, by the controller, whether the engine RPM has reached an engine RPM control point;
   determining, by the controller, an engine target RPM and an engine target RPM slope of the vehicle when it is determined that the engine RPM has reached the engine RPM control point;
   controlling, by the controller, the engine RPM of the vehicle to follow the engine target RPM and the engine target RPM slope;
   determining, by the controller, whether the engine RPM has slipped compared to the target engine RPM;
   performing proportional integral derivative (PID) control, by the controller, to follow the engine target RPM if the engine RPM slips compared to the engine target RPM;
   determining, by the controller, whether engine RPM control of the vehicle is ended; and
   ending the engine RPM control, by the controller, of the vehicle if it is determined that the engine RPM control of the vehicle is ended.

2. The method of claim 1, further comprising:
   after determining, by the controller, whether the engine RPM has reached an engine RPM control point,
   determining, by the controller, whether a driver has operated a clutch and shifted a gear;
   determining, by the controller, a clutch actuator target stroke when it is determined that the driver has operated the clutch and shifted the gear;
   performing, by the controller, a transmission RPM control of the vehicle to follow the clutch actuator target stroke;
   determining, by the controller, whether the transmission RPM control of the vehicle is ended; and
   ending the transmission RPM control, by the controller, of the vehicle if it is determined that the transmission RPM control of the vehicle is ended.

3. The method of claim 1, wherein:
   ending the engine RPM control, by the controller, of the vehicle includes switching from engine RPM control to engine torque (TQ) control.

4. The method of claim 1, wherein:
   in determining, by the controller, whether the engine RPM has reached the engine RPM control point, the engine RPM control point is determined by a first map table preset for the transmission RPM and an amount of operation of a pedal.

5. The method of claim 1, wherein:
   in determining, by the controller, the engine target RPM and the engine target RPM slope of the vehicle, the target engine RPM of the vehicle is determined by the transmission RPM and a second map table preset for the gear stage.

6. The method of claim 1, wherein:
   performing PID control, by the controller, to follow the engine target RPM is accomplished through responsive engine ignition timing and sustained throttle opening.

7. The method of claim 6, wherein:
   in a situation in which the engine RPM is overshot compared to the engine target RPM, the controller controls the engine ignition timing to be retarded and to reduce the throttle opening amount.

8. The method of claim 6, wherein:
   in a situation in which the engine RPM is undershot compared to the engine target RPM, the controller controls the engine ignition timing to advance and to increase the throttle opening amount.

9. The method of claim 1, wherein:
   in determining, by the controller, whether engine RPM control of the vehicle is ended, an end point of engine RPM control of the vehicle is determined by a transmission RPM and a third map table preset for the gear stage.

10. The method of claim 2, wherein:

in determining, by the controller, a clutch actuator target stroke, the clutch actuator target stroke is determined by a fourth map table preset for the gear stage and an amount of operation of a pedal.

11. A non-transitory computer readable medium containing program instructions executed by a processor, the computer readable medium comprising:

program instructions that determine whether a vehicle starts or not;

program instructions that determine an engine RPM and a gear stage of a vehicle transmission if the vehicle has started;

program instructions that determine whether the engine RPM has reached an engine RPM control point;

program instructions that determine an engine target RPM and an engine target RPM slope of the vehicle when it is determined that the engine RPM has reached the engine RPM control point;

program instructions that control the engine RPM of the vehicle to follow the engine target RPM and the engine target RPM slope;

program instructions that determine whether the engine RPM has slipped compared to the target engine RPM;

program instructions that perform proportional integral derivative (PID) control, by the controller, to follow the engine target RPM if the engine RPM slips compared to the engine target RPM;

program instructions that determine whether engine RPM control of the vehicle is ended; and program instructions that end the engine RPM control of the vehicle if it is determined that the engine RPM control of the vehicle is ended.

* * * * *